(12) United States Patent
Dakhil (10) Patent No.: US 11,806,961 B2
(45) Date of Patent: Nov. 7, 2023

(54) 3D MANUFACTURING OF GRAPHENE FOAM TIRES

(71) Applicant: Farouk Dakhil, Rome (IT)

(72) Inventor: Farouk Dakhil, Rome (IT)

( * ) Notice: Subject to any disclaimer, the term of this patent is extended or adjusted under 35 U.S.C. 154(b) by 176 days.

(21) Appl. No.: 17/564,406

(22) Filed: Dec. 29, 2021

(65) Prior Publication Data

US 2023/0202128 A1   Jun. 29, 2023

(51) Int. Cl.

| | |
|---|---|
| *B29D 30/00* | (2006.01) |
| *B29D 30/02* | (2006.01) |
| *B33Y 80/00* | (2015.01) |
| *B33Y 70/10* | (2020.01) |
| *B29D 30/08* | (2006.01) |
| *B29K 105/00* | (2006.01) |
| *B29K 507/04* | (2006.01) |
| *B29K 105/04* | (2006.01) |
| *B33Y 10/00* | (2015.01) |

(52) U.S. Cl.
CPC ............. *B29D 30/02* (2013.01); *B29D 30/08* (2013.01); *B33Y 70/10* (2020.01); *B33Y 80/00* (2014.12); *B29K 2105/0061* (2013.01); *B29K 2105/04* (2013.01); *B29K 2507/04* (2013.01); *B29K 2995/0056* (2013.01); *B33Y 10/00* (2014.12)

(58) Field of Classification Search
CPC .................................. B29D 30/02; B33Y 80/00
See application file for complete search history.

(56) References Cited

U.S. PATENT DOCUMENTS

2018/0237304 A1*   8/2018   Khe ...................... C01B 32/194

OTHER PUBLICATIONS

Lim., "Microplastics Are Everywhere " But Are They Harmful?; Nature; May 6, 2021; vol. 593; pp. 22-25.
Evangeliou et al., "Atmospheric transport is a major pathway of microplastics to remote regions"; Nature Communications; 2020; pp. 1-11.
Brubaker et al., "Biological performance of mussel-inspired adhesive in extrahepatic islet transplantation"; Biomaterials; 31; 2010; pp. 420-427.
Paton et al., "Scalable production of large quantities of defect-free few-layer graphene by shear exfoliation in liquids"; Nature Materials; vol. 13; Jun. 2014; pp. 624-630.
Han et al., "Mussel-Inspired Adhesive and Conductive Hydrogel with Long-Lasting Moisture and Extreme Temperature Tolerance"; Advanced Functional Materials; 2017; pp. 1-12.
Gong et al., "Upcycling Waste Polypropylene into Graphene Flakes on Organically Modified Montmorillonite"; Industrial & Engineering Chemistry Research; 2014; pp. 4173-4181.
Sha et al., "Three-Dimensional Rebar Graphene"; ACS Applied Materials & Interfaces; 2017; pp. 7376-7384.
Luong et al., "Gram-scale bottom-up flash graphene synthesis"; Nature; Jan. 27, 2020; pp. 1-7.

(Continued)

*Primary Examiner* — Nicholas R Krasnow
(74) *Attorney, Agent, or Firm* — Maier & Maier, PLLC (57) ABSTRACT

3D printers may fabricate tires with graphene-based materials. Biopolymers may be used to produce graphene foam. Molten salt synthesis with metallic powders may produce coatings for the foam to protect the tires from oxidation. Graphene oxide sheet may also be applied to the tire structure using an inexpensive bio-adhesive.

14 Claims, 6 Drawing Sheets

(56) References Cited

OTHER PUBLICATIONS

Pham et al., "Microplastics as hubs enriching antibiotic-resistant bacteria and pathogens in municipal activated sludge"; Journal of Hazardous Materials Letters; 2021; pp. 1-7.
Wu et al., "Three-dimensionally bonded spongy graphene material with super compressive elasticity and near-zero Poisson's ratio"; Nature Communications; Jan. 20, 2015; pp. 1-9.
Pandey et al., "Graphene nanosheets deriving from plastic waste for the application of DSSCs and supercapacitors"; Scientific Reports; 2021; pp. 1-17.
Constantin et al., "Spontaneous formation of multilayer refractory carbide coatings in a molten salt media"; PNAS; vol. 118; No. 18; 2021; pp. 1-5.
Masud et al., "Emerging investigator series: 3D printed graphene-biopolymer aerogels for water contaminant removal: a proof of concept"; Environmental Science Nano; vol. 8; No. 2; Feb. 2021; pp. 399-414.

\* cited by examiner

3D MANUFACTURING OF GRAPHENE FOAM TIRES

BACKGROUND

Tires comprise a mix of elastomers such as rubber, natural or synthetic. Unvulcanized natural rubber may also be known as caoutchouc. Tires may further comprise carbon black, steel cord, fibers, and other inorganic components. Depending on the type of tire, the road surface, the vehicle characteristics, as well as the vehicle's state of operation, tires will produce tire wear particles (TWPs) as pollutants.

These TWPs may be produced via both mechanical abrasion and corrosion. Following rainfall, TWPs may flow from road surface into nearby streams, resulting in pollution of aquatic environments with microplastics derived from the elastomers in tires. In addition to riverine transport of TWPs to the ocean, atmospheric microplastic transport may also result in TWPs eventually being deposited in the ocean.

As described in "Wear and Tear of Tyres: A Stealthy Source of Microplastics in the Environment" by Kole et al., global average emissions of TWPs may be 0.81 kg per capita each year. The relative contribution of tire wear and tear to the total global amount of plastics ending up in our oceans is estimated to be 5-10%. In the air, 3-7% of the particulate matter ($PM_{2.5}$) is estimated to consist of tire wear and tear, indicating that it may contribute to the global health burden of air pollution, which may cause millions of deaths, according to the World Health Organization (WHO).

As described in "Seafloor Microplastic Hotspots Controlled by Deep-Sea Circulation" by Kane et al., millions of tons of plastic may enter the global ocean each year. Much of this plastic ends up in the deep sea. Microplastics can be ingested by organisms across all tropic levels, enabling transfer of harmful toxic substances. On land, TWPs may be a major source, producing up to 39.5% of microplastic particles that are eventually carried by rivers into the sea.

As described in "Microplastics Are Everywhere—But Are They Harmful" by Xiao Zhi Lim, there may be between 15 trillion and 51 trillion microplastic particles floating in surface waters worldwide. From limited surveys of microplastics in the air, water, salt, and seafood, children and adults may ingest anywhere from dozens to more than 100,000 microplastic specks each day. The tiniest specks, called nanoplastics, worry researchers most of all. Some nanoplastics may be able to enter cells, potentially disrupting cellular activity.

The levels of microplastics and nanoplastics may be too low in the environment to affect human health now, but these levels are projected to rise rapidly. The amount of plastic added to existing waste each year may double by 2040. Hence, there is a need to curb plastic pollution, in general. Reduced production of TWPs may be one way to achieve this goal. Therefore, an effective solution is still needed to reduce plastic waste resulting from tires.

SUMMARY

According to an exemplary embodiment, a method of manufacturing a tire may comprise adding at least one biopolymer to a graphene-based ink to produce a foam; using 3D printing to produce a graphene-biopolymer aerogel from the foam; using molten salt synthesis to produce a coating material; applying the coating material to the graphene-biopolymer aerogel; fixing the graphene-biopolymer aerogel in a tire form structure; using the 3D printing to produce graphene-oxide sheets; and applying the graphene-oxide sheets to an outer rim of the tire form structure to produce the tire.

According to an exemplary embodiment, the at least one biopolymer may comprise polydopamine (PDA). In another exemplary embodiment, the at least one biopolymer may comprise bovine serum albumin (BSA).

According to an exemplary embodiment, the molten salt synthesis may use potassium chloride (KCl). At least one metallic powder may be added to molten salt during the molten salt synthesis. In an exemplary embodiment, the at least one metallic powder may comprise a chromium powder. In an exemplary embodiment, the at least one metallic powder may comprise a titanium powder. Carbon fibers may be added to molten salt during the molten salt synthesis.

In an exemplary embodiment, the coating material may comprise three layers. The three layers may comprise layers of chromium carbide and titanium carbide.

In an exemplary embodiment, fixing the graphene-biopolymer aerogel may use a synthetic adhesive biomaterial. The synthetic adhesive biomaterial may be derived from a mussel adhesive protein.

In an exemplary embodiment, chlorosulfuric acid may be in the production of the graphene-oxide sheets. The graphene-oxide sheets may encapsulate the outer rim of the tire form structure.

BRIEF DESCRIPTION OF DRAWINGS

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments" or "invention" do not require that all embodiments of the invention include the discussed feature, advantage, or mode of operation.

Referring to exemplary FIG. 1, a method of manufacturing a tire may include the steps disclosed below.

In step 110, to prepare the aerogel for the 3D printing process two bio-inspired substances, polydopamine (PDA) and bovine serum albumin (BSA), may be added to a graphene-based ink to create a foam. PDA, an oxidation product of dopamine, is an emerging nature-inspired biopolymer material that possesses many interesting properties including self-assembly and universal adhesion. Mussel-inspired PDA may be especially useful as an adhesive.

BSA, also known as "Fraction V," is a serum albumin protein derived from cows. As BSA is the third most abundant whey protein in milk, it may be relatively inexpensive. BSA may be chemically polymerized to produce polymerized BSA, such as Probumin®.

As described in "Emerging Investigator Series: 3D Printed Graphene-Biopolymer Aerogels for Water Contaminant Removal: A Proof of Concept" to Masud et al., PDA and BSA may be added to graphene-based ink to produce a graphene-PDA-PSA aerogel. A 3D printing approach may permit use of this aerogel as a functional nanomaterial. Such 3D printing may enable shape-specific applications for large-scale manufacturing. The aerogel, as a foam structure, may be ultralight but resilient.

Aerogel synthesis may rely on the self-assembly of individual graphene nanosheets. Self-assembly is a promising approach to construct advanced functional materials and systems based on graphene. The resulting nanomaterial may have a hierarchical porous structure due to the 2D planar honeycomb array formed by monolayer carbon atoms in each graphene nanosheet.

Graphene may be 200 times stronger than steel. Due to the strength of its 0.142 nm-long carbon bonds, graphene may have a tensile strength of 130 gigapascals, compared to a tensile strength of 400 megapascals for A36 structural steel. A tire fabricated from graphene may be 100 times lighter in weight than conventional tires.

In step 120, the desired tire form and structure may be created by 3D printing using a graphene-based ink. 3D printing may permit the fabrication of tires with different sizes, shapes, and forms. With the same 3D printers, other graphene-based items may also be fabricated. In exemplary embodiments, 3D printers could also be used to manufacture packaging cartons, shopping bags, cups, and plates using the graphene-based ink.

After 3D printing, the structure may be ready for further processing. Carbon fibers oxidize readily. Just as wood burns when exposed to heat and oxygen, carbon fibers may burn during braking. Hence, there is a need for shielding to protect carbon fibers in the tire from oxidation. Molten salt synthesis (MSS) may be used to produce a shielding material.

In step 130, the MSS may involve melting a salt in a reactor at a relatively low temperature. In an exemplary embodiment, this temperature may be 950° C.

In yet another exemplary embodiment, the MSS may use potassium chloride (KCl) as the molten salt. KCl has a melting point of substantially 776° C. at ambient pressures. Alternative compounds may also be used in the MSS.

During the MSS, metallic powders may be added to molten salt after the salt crystals become a liquid. In an exemplary embodiment, chromium (Cr) and titanium (Ti) powders may be used. These powders are known to withstand high temperatures. Alternative metallic powders may also be used.

In an exemplary embodiment for the MSS, KCl in the molten salt may dissolve both the Cr and Ti powders. Using KCl as the reaction media may require five hours at 950° C. Alternative time periods may be applicable when different temperatures are used.

The Cr powder may react with the KCl to produce chromium chlorides. These chlorides may be chromium trichloride ($CrCl_3$) and chromium dichloride ($CrCl_2$). The Ti powder may react with the KCl to produce titanium chlorides. These chlorides may be titanium tetrachloride ($TiCl_4$), titanium trichloride ($TiCl_3$), or titanium dichloride ($TiCl_2$).

Carbon fibers may then be added to the molten salt bath. A spontaneous reaction may occur that is self-organized. The chromium chloride may react with the carbon fibers to produce a chromium carbide. In an exemplary embodiment, the chromium carbide may be $Cr_3C_2$. Alternative chromium carbides may include $Cr_7C_3$, and $Cr_{23}C_6$. The titanium chlorides may react with the carbon fibers to produce titanium carbide (TiC).

This reaction process may yield a three-layer coating made of chromium carbide and titanium carbide. This coating may be multi-layered because Ti and Cr each have different reaction rates with the molten salt. In an exemplary embodiment, this three-layer coating may consist of a sandwiched structure of $Cr_3C_2$, TiC, and $Cr_3C_2$. This coating may provide a protecting shield barrier against oxidation for a tire.

As described in "Spontaneous Formation of Multilayer Refractory Carbide Coatings in a Molten Salt Media" by Constantin et al., an MSS process allows the synthesis of a complex multilayer coating of refractory carbides on carbon materials. Multilayer coated carbon fibers may act as a permeable oxidation barrier with no crystalline degradation of the carbon fibers after extreme temperature, such as 1200° C., and oxyacetylene flame exposure. Hence, the synthesis of high-quality multilayer refractory coatings may answer the need for industrial applications that require cheap and reliable extreme environment protection barriers.

In step 140, the coating material may be applied to the aerogel. After the molten salt synthesis (MSS) process has terminated, the salt may be washed away in boiling water. For application of the coating material to a tire, the 3D printer may use the shape of a doughnut as a template. After coating all of the tire, there may be a need to ensure that the coating material is not easily separated from the tire.

In step 150, the tire form structure may be fixed in shape by using a bio-inspired glue. As described in "Biological Performance of Mussel-Inspired Adhesive in Extrahepatic Islet Transportation" to Brubaker et al., an adhesive precursor polymer may consist of a branched polyethylene glycol (PEG) core. Catechol, a functional group abundant in mussel adhesive proteins, may be used to derivatize endpoints of the PEG core. In various exemplary embodiments, other adhesive materials may be used.

In step 160, the 3D printer may produce graphene oxide sheets. Chrorosulfuric acid ($HSO_3Cl$), also known as chlorosulfonic acid, may be used in exemplary embodiments in a concentration of 1%. The diluted chlorosulfuric acid may be poured in the 3D printers. Fabrication of graphene oxide sheets in the 3D printers should not damage the honeycomb structure of the graphene arrays. The graphene oxide sheets may then be treated with the triple-layer coating disclosed as a shielding material in step 130.

As described in "Scalable Production of Large Quantities of Defect-Free Few-Layer Graphene by Shear Exfoliation in Liquids" by Paton et al., high-shear mixing of graphene in suitable stabilizing liquids to produce graphene nanosheets. This process may be industrially scalable to produce large quantities of defect-free graphene. Production rates can be increased by scaling up the mixing volume.

In step 170, the graphene oxide sheets may be applied to an outer rim of the tire rim structure to produce the tire. In an exemplary embodiment, the encapsulated graphene foam may now be mounted on the all-aluminum rims of a vehicle wheel.

Figure 1:
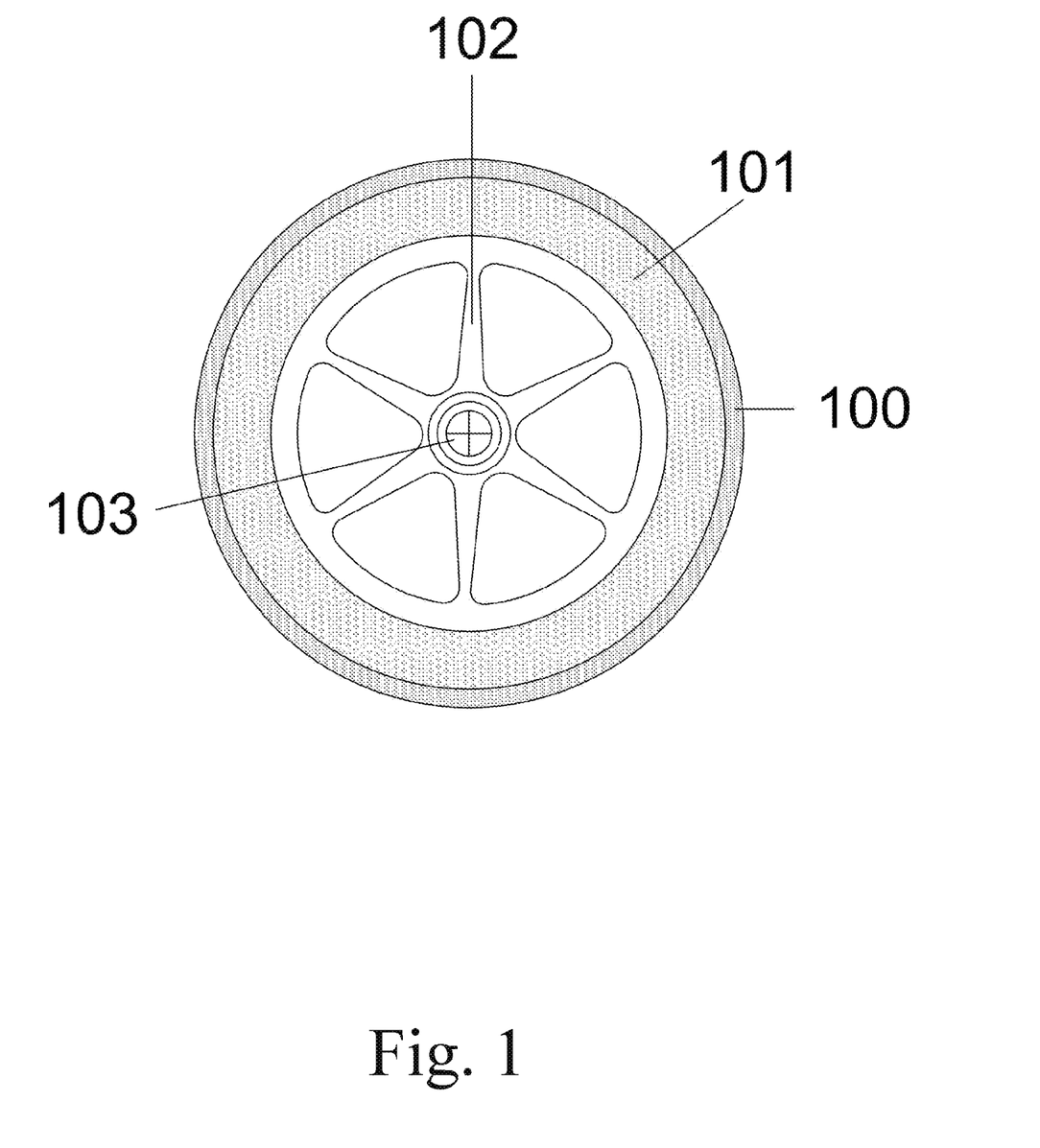
FIG. 1 shows a method of manufacturing a tire.
Figure 2:
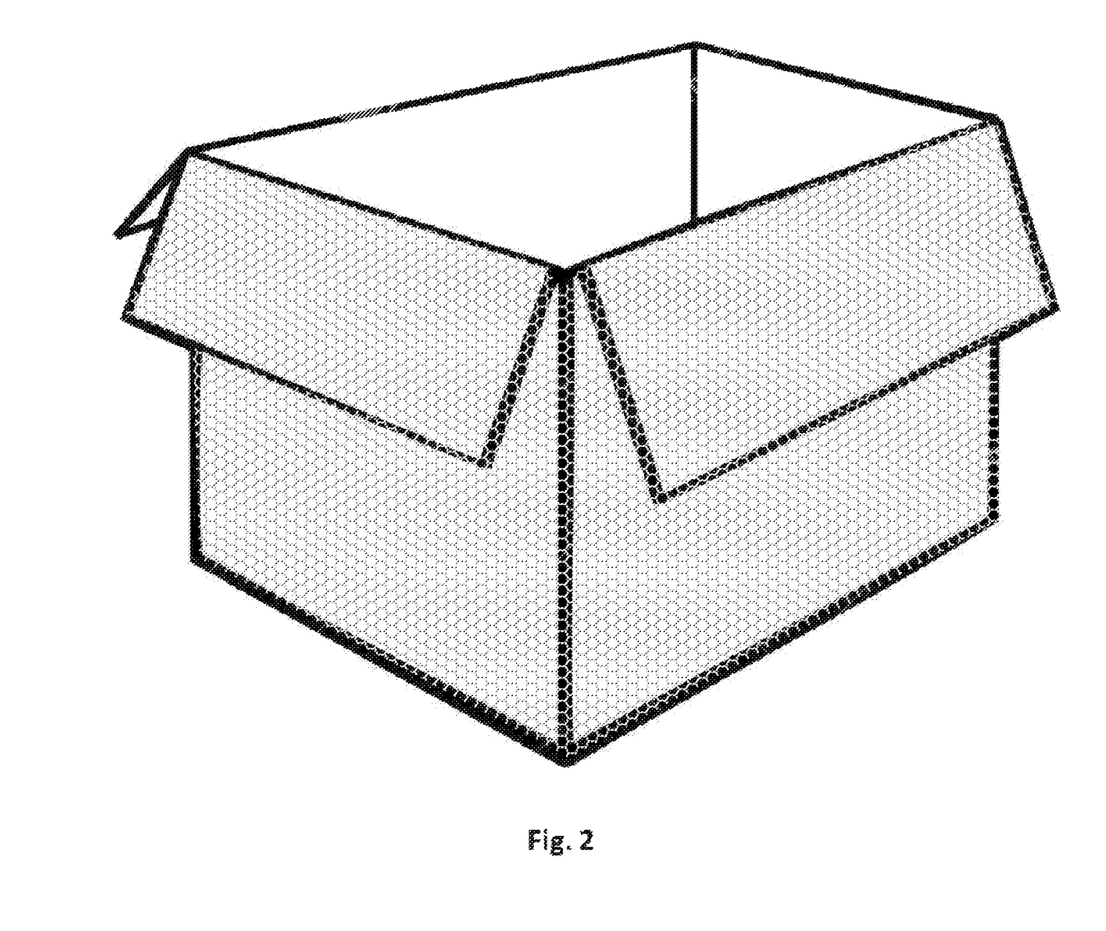
FIG. 2 shows a wheel using the tire of FIG. 1.

FIG. 2 shows a cross-section of a vehicle's wheel using the tire fabricated with the method of FIG. 1.

The outer ring 210 may be made of compressed graphene oxide fibers or sheets. The outer ring 210 may enclose graphene foam 220. This graphene foam 220 may be fabricated from biopolymer as described in step 110. An adhesive, as described in step 150, may secure graphene foam 220 to outer ring 210. An all-aluminum rim 230 may be fixed on a rotating axis 240 of the wheel. Unlike conventional tires, the graphene foam 220 does not need to have added air. A tire with the graphene foam 220 may also run over stones, glass, and even sharp metals without getting flat.

Figure 3:
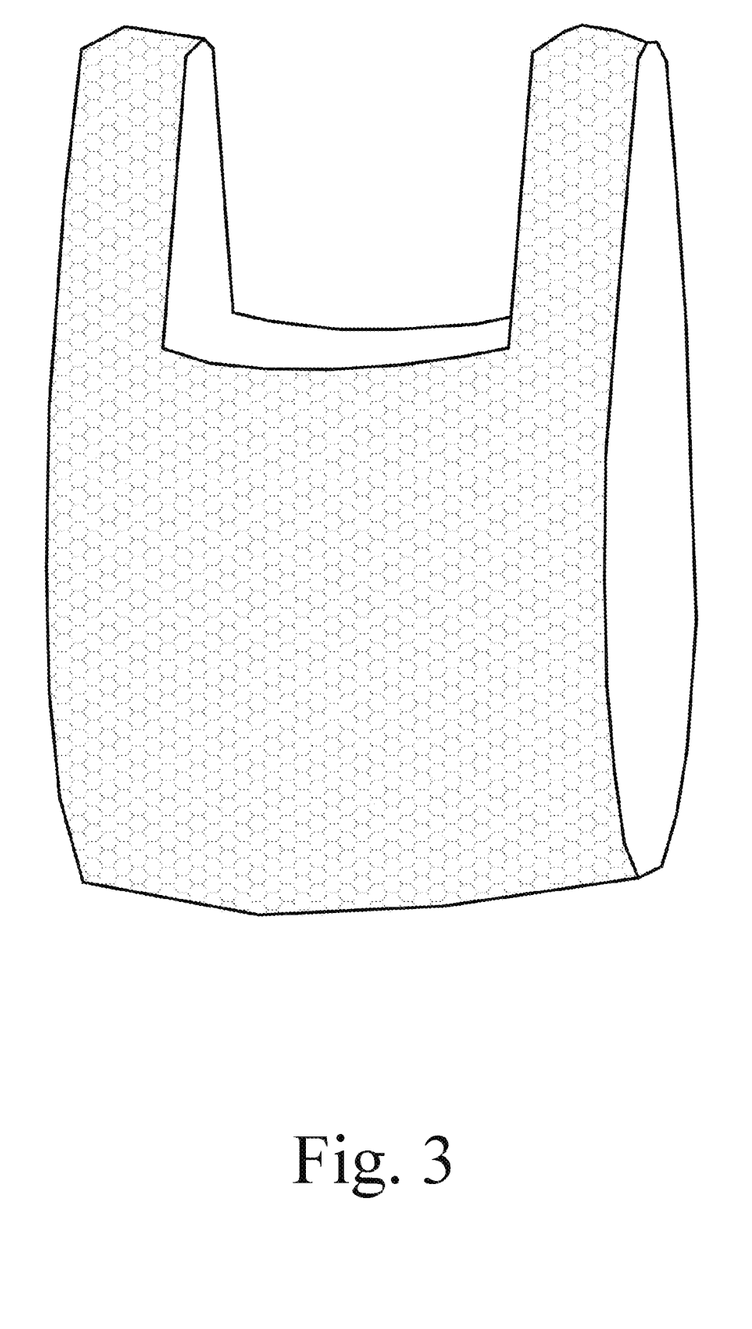
FIG. 3 shows an alternative embodiment of a packing carton.

FIG. 3 shows an alternative embodiment of a packing carton 300. The packing carton 300 made with the graphene foam 220 can be used for purposes such as shipping or carrying of objects. It is lightweight but strong and resilient as it is made of graphene foam 220. Due to the triple-layer coating it may also resist harsh environmental conditions and temperature changes.

Figure 4:
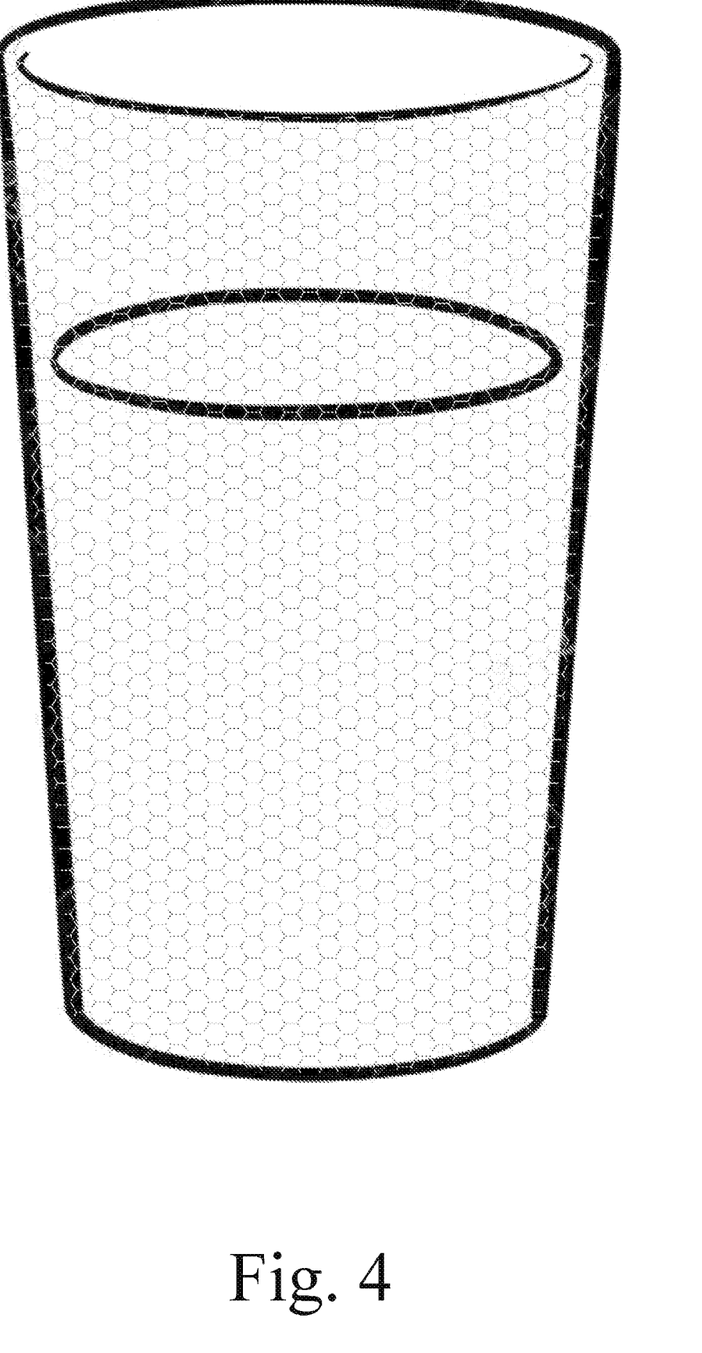
FIG. 4 shows an alternative embodiment of a shopping bag.

FIG. 4 shows an alternative embodiment of a shopping bag 400. Graphene oxide sheets, fabricated as described above in step 160, may be joined with a "U" shape at each end. After being folded together, the graphene oxide sheets may be bonded by an adhesive inside a 3D printer. This adhesive may be the bio-inspired glue described above in step 150. The created bag 400 may then be treated with the triple coating procedure described above in steps 130 and 140.

Figure 5:
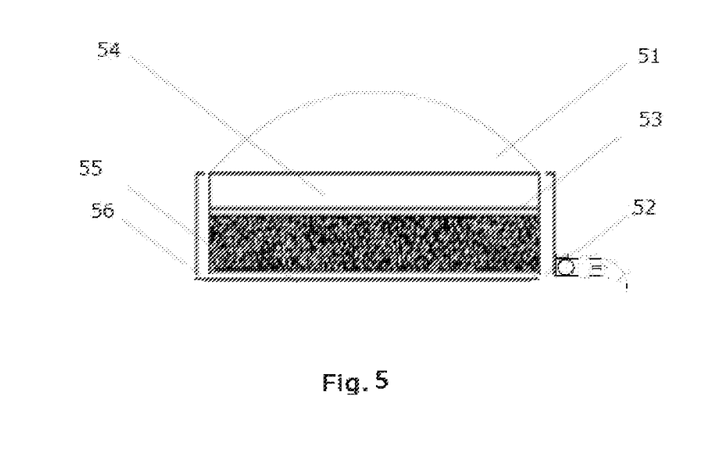
FIG. 5 shows an alternative embodiment of a cup.

FIG. 5 shows an alternative embodiment of a cup 500. Graphene oxide sheets, such as the sheets made in step 160, may be folded into desired shapes, such as cup 500. Alternative shapes are possible, such as dishes, buckets, or bowls. After fabrication, the created objects may be treated with the triple coating shielding procedure of steps 130 and 140. The resulting cup 500 can resist high-temperature changes and does not leak liquids. Cup 500, unlike objects made of plastic, is biodegradable, so it has minimal impact on the environment.

Figure 6:
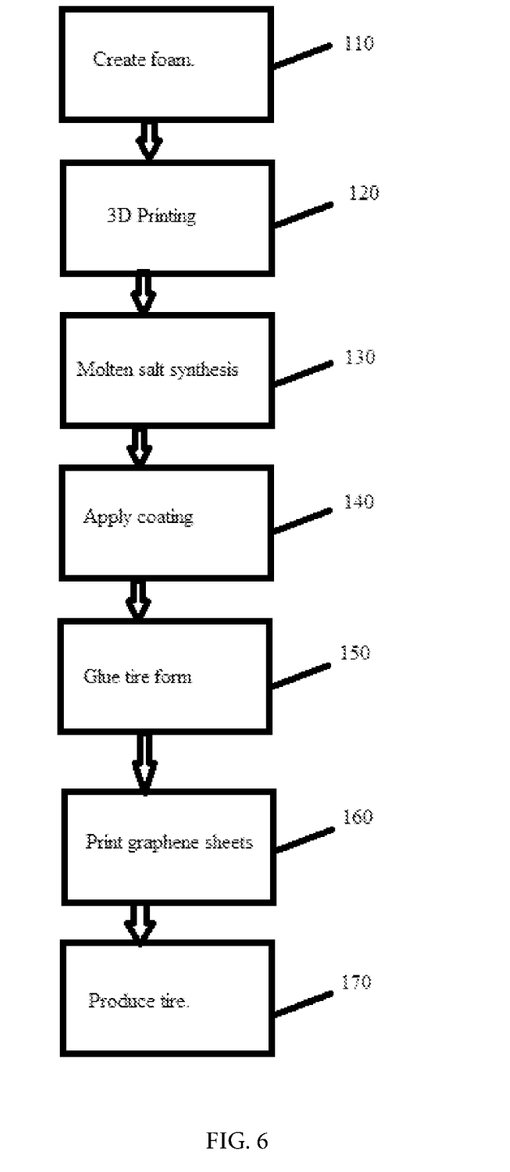
FIG. 6 shows a chamber for the conversion of organic matter into graphene.

Exemplary FIG. 6 shows a chamber 600 for the conversion of organic matter into graphene. Graphene may fabricated in various ways. In an exemplary embodiment, waste organic materials may be converted into graphene. The organic materials may be plastics.

In chamber 600, waste organic material, including various types of plastics, may be heated by concentrated solar energy via lens 610 and an electric socket 620 for additional electric heating in case there is not enough sunlight. In an exemplary embodiment, there may be a layer of carbon nanotubes 630 spaced at a distance 640. Hence, a focal point of the lens 610 may be aligned with the carbon nanotube layer 630 to absorb the heat from sunlight in a homogeneous way and conduct it to the organic material located underneath at 650.

Conversion of waste organic materials into graphene may be achieved in a low cost process. In an exemplary embodiment, solar energy may be concentrated using concave mirrors. Alternatively, concave lenses may be used. The concentrated solar energy may be applied to a stainless steel chamber with the waste organic materials. Under suitable conditions, a rapid phase transition may convert the waste organic materials rapidly into homogenous hexagonal layers of graphene. In various exemplary embodiments, the speed of this phase transition could be reduced to a fraction of a second.

As described in "Graphene Nanosheets Derived From Plastic Waste For the Application of DSSCs and Supercapacitors" to Pandey et al., bentonite nanoclay may be used as an agent for the degradation of waste plastics in two-step pyrolysis processes. Among the variety of plastic products, polypropylene (PP), polyethylene (PE), and polystyrene (PS) are considered to be good precursor materials for the synthesis of carbon nanomaterials due to their high carbon content. Carbon nanomaterials such as carbon nanotubes (CNTs), carbon spheres, carbon fibers, and graphene nanosheets (GNs) may be synthesized from the plastic waste.

As described in "Upcycling Waste Polypropylene Into Graphene Flakes on Organically Modified Montmorillonite" to Gong et al., graphene flakes (GFs) may be synthesized through catalytic carbonization of waste polypropylene (PP). As further described in "Gram-Scale Bottom-Up Flash Graphene Synthesis" to Luong et al., flash Joule heating of inexpensive carbon sources, such as mixed plastic waste, can produce gram-scale quantities of graphene in less than one second. No purification steps are necessary.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of manufacturing a tire comprising:
   adding at least one biopolymer to a graphene-based ink to produce a foam;
   using 3D printing to produce a graphene-biopolymer aerogel from the foam;
   using molten salt synthesis to produce a coating material;
   applying the coating material to the graphene-biopolymer aerogel;
   fixing the graphene-biopolymer aerogel in a tire form structure;
   using the 3D printing to produce graphene-oxide sheets; and
   applying the graphene-oxide sheets to an outer rim of the tire form structure to produce the tire.

2. The method of manufacturing the tire of claim 1, wherein the at least one biopolymer comprises polydopamine (PDA).

3. The method of manufacturing the tire of claim 1, wherein the at least one biopolymer comprises bovine serum albumin (BSA).

4. The method of manufacturing the tire of claim 1, wherein the molten salt synthesis uses potassium chloride (KCl).

5. The method of manufacturing the tire of claim 1, further comprising:
   adding at least one metallic powder to molten salt during the molten salt synthesis.

6. The method of manufacturing the tire of claim 5, wherein the at least one metallic powder comprises a chromium powder.

7. The method of manufacturing the tire of claim 5, wherein the at least one metallic powder comprises a titanium powder.

8. The method of manufacturing the tire of claim 1, further comprising:
   adding carbon fibers to molten salt during the molten salt synthesis.

9. The method of manufacturing the tire of claim 1, wherein the coating material comprises three layers.

10. The method of manufacturing the tire of claim 9, wherein the three layers comprise layers of chromium carbide and titanium carbide.

11. The method of manufacturing the tire of claim 1, wherein fixing the graphene-biopolymer aerogel uses a synthetic adhesive biomaterial.

12. The method of manufacturing the tire of claim 11, wherein the synthetic adhesive biomaterial is derived from a mussel adhesive protein.

13. The method of manufacturing the tire of claim 1, further comprising:
   using chlorosulfuric acid in the production of the graphene-oxide sheets.

14. The method of manufacturing the tire of claim 1, wherein the graphene-oxide sheets encapsulate the outer rim of the tire form structure.

\* \* \* \* \*